US009334031B2

United States Patent
Mori et al.

(10) Patent No.: US 9,334,031 B2
(45) Date of Patent: May 10, 2016

(54) SYSTEM FOR ATTITUDE CONTROL OF UNDERWATER VEHICLE AND METHOD FOR ATTITUDE CONTROL OF UNDERWATER VEHICLE

(71) Applicant: Hitachi-GE Nuclear Energy, Ltd., Hitachi-shi, Ibaraki (JP)

(72) Inventors: Hayato Mori, Tokyo (JP); Ryosuke Kobayashi, Tokyo (JP); Satoshi Okada, Tokyo (JP); Naoyuki Kono, Tokyo (JP); Katsuhiko Hirano, Hitachi (JP); Yosuke Takatori, Hitachi (JP); Masahiro Tooma, Tokyo (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 58 days.

(21) Appl. No.: 14/315,993

(22) Filed: Jun. 26, 2014

(65) Prior Publication Data
US 2015/0090175 A1   Apr. 2, 2015

(30) Foreign Application Priority Data
Jun. 28, 2013   (JP) ................. 2013-135692

(51) Int. Cl.
*B63G 8/14*   (2006.01)
*B63G 8/00*   (2006.01)
*B65H 75/44*   (2006.01)
*G21C 17/013*   (2006.01)

(52) U.S. Cl.
CPC   *B63G 8/001* (2013.01); *B63G 8/14* (2013.01); *B65H 75/4484* (2013.01); *G21C 17/013* (2013.01); *B63G 2008/007* (2013.01)

(58) Field of Classification Search
CPC ........... B63G 8/00; B63G 8/001; B63G 8/14; B63G 2008/00; B63G 2008/001; B63G 2008/007; B65H 75/4484; G21C 17/013
USPC .......................................... 114/312, 313, 322
See application file for complete search history.

(56) References Cited

U.S. PATENT DOCUMENTS

| | | | | |
|---|---|---|---|---|
| 4,618,285 A | * | 10/1986 | Ahlstone | E21B 41/04 29/235 |
| 8,186,295 B2 | * | 5/2012 | Fournier | B63B 21/66 114/332 |
| 9,080,425 B2 | * | 7/2015 | Zediker | B63G 8/001 |

(Continued)

FOREIGN PATENT DOCUMENTS

| | | |
|---|---|---|
| JP | 8-216984 A | 8/1996 |
| JP | 10-221482 A | 8/1998 |

(Continued)

*Primary Examiner* — Daniel V Venne
(74) *Attorney, Agent, or Firm* — Crowell & Moring LLP

(57) ABSTRACT

A system for attitude control of an underwater vehicle 20 of the present invention includes an underwater vehicle 20 with a thruster 65, an assist device 10 that is coupled to the underwater vehicle 20 with a cable 1 and has cable handling equipment 2 and a thruster 58, a cable attachment-to-attachment distance detection unit 50 that detects distance between a cable attachment of the underwater vehicle 20 and a cable dispenser of the assist device 10, and a control unit 32 that previously stores the relationship between the attachment-to-attachment distance and cable length including a predetermined amount of slack and determines the amount of cable to be wound up or let out based on the cable length associated with the detected attachment-to-attachment distance.

11 Claims, 6 Drawing Sheets

(56) References Cited

U.S. PATENT DOCUMENTS

2008/0029015 A1* 2/2008 Amidon ................ B63B 22/003
  114/328
2010/0212574 A1* 8/2010 Hawkes ................ B63C 11/42
  114/328

FOREIGN PATENT DOCUMENTS

| JP | 2002-220088 A | 8/2002 |
| JP | 2005-315709 A | 11/2005 |
| JP | 2008-296875 A | 12/2008 |

* cited by examiner

- ∠B' OF = ∠BOF = α
- b: DISTANCE BETWEEN LED 11c AND CONNECTOR 15
- c: DISTANCE BETWEEN CENTER OF LENS OF MONITORING CAMERA 3 AND CABLE DISPENSER 18
- d: VERTICAL DISTANCE BETWEEN CENTER OF LENS OF MONITORING CAMERA 3 AND PLANE 27

| | CABLE ATTACHMENT-TO-ATTACHMENT DISTANCE 23 | YAW ANGLE 24 | ACCEPTABLE RANGE (AMOUNT OF SLACK) | CABLE LENGTH |
|---|---|---|---|---|
| 1 | D1(15,18) | $\theta_1$ | $\Delta L$ | L1 |
| 2 | D2(15,18) | $\theta_2$ | $\Delta L$ | L2 |
| .. | ... | ... | ... | ... |
| N | Dn(15,18) | $\theta_n$ | $\Delta L$ | Ln |

SYSTEM FOR ATTITUDE CONTROL OF UNDERWATER VEHICLE AND METHOD FOR ATTITUDE CONTROL OF UNDERWATER VEHICLE

CLAIM OF PRIORITY

The present application claims priority from Japanese Patent application serial No. 2013-135692, filed on Jun. 28, 2013, the content of which are hereby incorporated by reference into this application.

FIELD OF THE INVENTION

This invention relates to a system for attitude control of underwater vehicles used to conduct surveys or inspections under water and a method for attitude control of the underwater vehicles.

BACKGROUND OF THE INVENTION

A nuclear in-reactor inspection system that uses an underwater vehicle to perform inspection tasks on structures inside a nuclear reactor has been known. The underwater vehicle is generally connected to a control device installed off the water with a cable that is used to receive power supply from and to perform signal transmission and reception with the control device. However, when the underwater vehicle is used alone to conduct inspections, the cable may be caught on the structures and therefore may obstruct movement of the underwater vehicle. As a measure to counter the problem, Japanese Unexamined Patent Application Publication No. 2008-296875 (hereinafter JPA 2008-296875) discloses a cable assist device that carries cable handling equipment and is coupled between an underwater vehicle and a control device. In JPA 2008-296875, cable tension, which is calculated from detection results obtained by a cable-tension detection unit of the underwater vehicle, and cable tension, which is calculated from detection results obtained by a tension detection unit of the assist device, are used to detect if the cable is caught on the structures.

However, the system in JPA 2008-296875 is capable of detecting the cable caught on the structures based on changes in the cable tension on the underwater vehicle side and the cable tension on the assist device side, but does not take the effects of external force generated from the cable of the underwater vehicle under regular navigation into consideration, and the external force of the cable may make it difficult for the underwater vehicle to travel.

SUMMARY OF THE INVENTION

The present invention provides a system and a method for attitude control of an underwater vehicle, the system and method being capable of eliminating the effects of external force from a cable on the underwater vehicle.

The present invention is directed to a system for attitude control of an underwater vehicle including an underwater vehicle with a thruster, an assist device that is coupled to the underwater vehicle with a cable and has cable handling equipment and a thruster, a cable attachment-to-attachment distance detection unit that detects distance between a cable attachment of the underwater vehicle and a cable dispenser, serving as a cable attachment, of the assist device, and a control unit that previously stores the relationship between the attachment-to-attachment distance and cable length including a predetermined amount of slack and determines the amount of cable to be wound up or let out based on a cable length associated with the detected attachment-to-attachment distance.

The present invention can eliminate the effects of external force from the cable on the underwater vehicle and improve maneuverability of the underwater vehicle.

DETAILED DESCRIPTION OF THE PREFERRED EMBODIMENTS

With reference to the accompanying drawings, embodiments of the present invention will be described below.

First Embodiment

Figure 2:
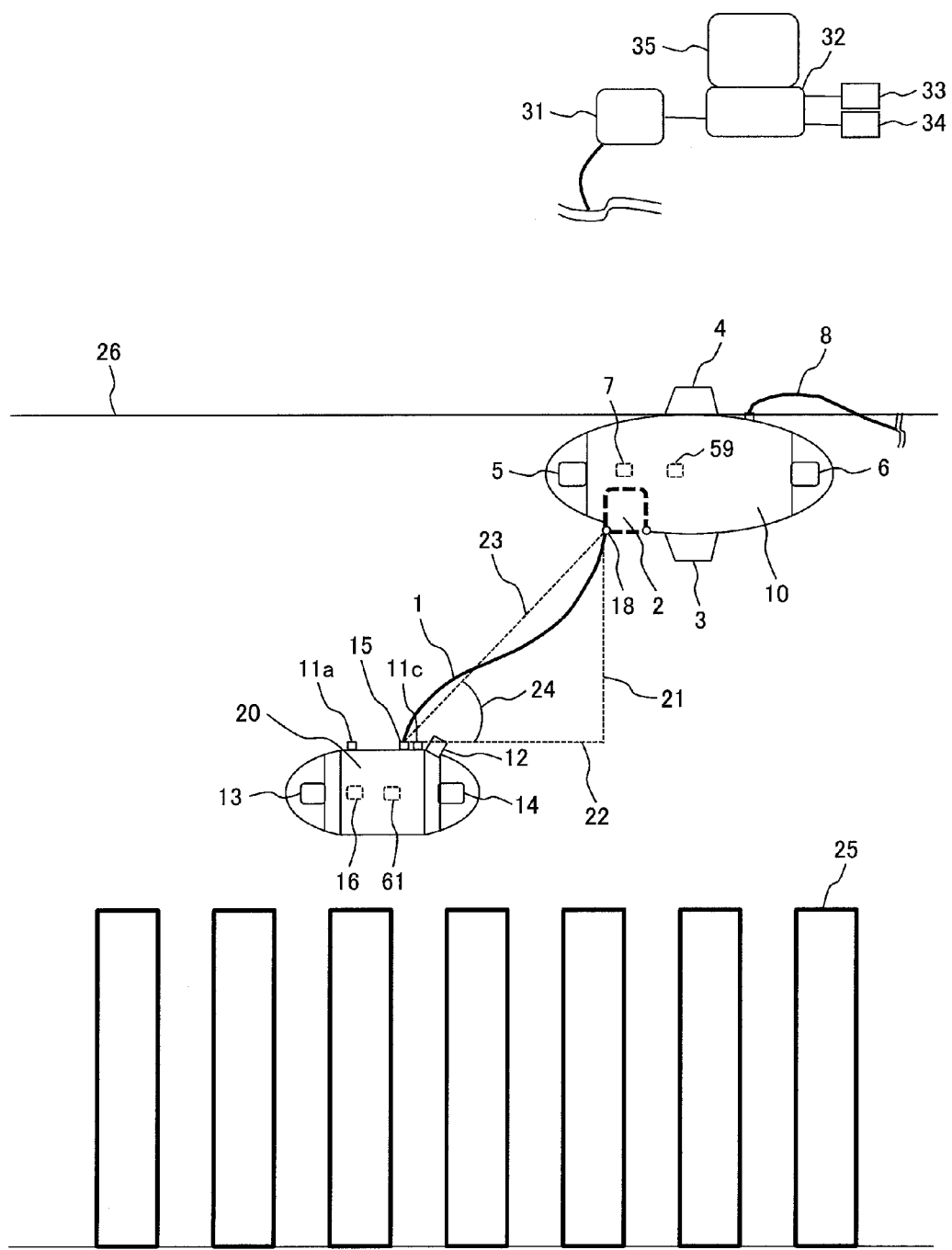
FIG. 2 is a schematic diagram of the system for attitude control of the underwater vehicle according to the first embodiment of the present invention.

FIG. 2 is a schematic diagram of a system for attitude control of an underwater vehicle according to the first embodiment of the present invention. The following describes an example in which the underwater vehicle is applied for inspections of a spent fuel pool 26 in a nuclear reactor building.

In FIG. 2, spent fuel 25 is stored in a spent fuel pool 26 filled with water. An underwater vehicle 20 has a thruster that allows the underwater vehicle 20 to navigate in the water. An assist device 10 has a thruster that allows the assist device 10 to move on the water and near the surface of the water. The underwater vehicle 20 and the assist device 10 are coupled to each other with a cable 1. The assist device 10 is also coupled with a cable 8 to a winch 31 that is installed on a desired floor of the nuclear reactor building. Thus, the assist device 10 is connected to a control device 32, a first operation device 33 used to operate the assist device 10, a second operation device 34 used to operate the underwater vehicle 20, and a display device 35. The cable 1 and cable 8 used herein are multi-core stranded cables including a power feed line and a communication line in a bundle. In a case where the underwater vehicle 20 and assist device 10 carry a battery, respectively, the power feed line is not necessary, and the cables 1, 8 include only the communication line. The floor on which the winch 31, control device 32, first operation device 33, second operation device 34, and display device 35 are installed inside the nuclear reactor building shares, for example, the same operation floor with the floor in which the spent fuel pool 26 is built.

The underwater vehicle 20 includes an inspection camera 13 mounted at a front part of the hull thereof, an inspection camera 14 mounted at a rear part of the hull, a monitoring camera 12 used to monitor above the underwater vehicle 20, an inclinometer 16, and a depth finder 61. In addition, a connector 15, which is a cable attachment to fasten one end of the cable 1, and light emitting devices, or LEDs, 11a, 11b, 11c, 11d, which are arranged at four positions around the connector 15, are provided on an upper surface of the hull of the underwater vehicle 20. The inspection cameras 13, 14 capture images of wall surfaces of the spent fuel 25 and spent fuel pool 26 and the images are sent through the cable 1 and cable 8 to the display device 35 that displays the images on its screen.

The assist device 10 includes an environment recognition camera 5 that is mounted at a front part of the hull thereof and used to recognize its location in the spent fuel pool 26, an environment recognition camera 6 that is mounted at a rear part of the hull in the same manner and used to recognize its location in the spent fuel pool 26, a monitoring camera 3 used to monitor below the assist device 10, an environment recognition camera 4 that is mounted on an upper surface of the assist device 10 and used to capture images above the assist device 10 inside the nuclear reactor building, an inclinometer 7, and a depth finder 59. In addition, the assist device 10 includes a winch 2 that lets out or winds up the cable 1 and a cable dispenser 18 that is a cable attachment for the cable 1 on the assist device 10 side and winds up the cable 1 into the assist device 10 or lets the cable 1 out of the assist device 10. The monitoring camera 3 and environment recognition cameras 4, 5, 6 capture images and the images are sent via the cable 8 to the display device 35 that displays the images on its screen. The inclinometers 7, 16 used herein are measuring instruments capable of sensing three dimensional tilt (hull's attitude) of the underwater vehicle 20 and assist device 10 by detecting the roll angle and pitch angle. For instance, the inclinometers detect the roll angle and pitch angle based on surface displacement of an electrolyte solution encapsulated therein.

An operator who maneuvers the underwater vehicle 20 operates the operation device 33 to move the underwater vehicle 20 to desired locations, while checking images displayed on the display device 35, the images including images captured by the inspection cameras 13, 14 and an image of an area above the underwater vehicle 20 captured by the monitoring camera 12. Then, a visual survey or visual inspection of the wall surface conditions of the spent fuel 25 and spent fuel pool 26 is conducted. In addition, the operator of the underwater vehicle 20 can maneuver the underwater vehicle 20 as if the operator views the underwater vehicle 20 from above by checking images captured by the monitoring camera 3 mounted on the assist device 10, thereby improving maneuverability. The operator of the assist device 10 can maneuver the assist device 10 as confirming the location of the assist device 10 inside the nuclear reactor building, more specifically the horizontal location in the spent fuel pool 26 by checking an image on the display device 35 captured by the environment recognition camera 4. Furthermore, checking images from the environment recognition cameras 5, 6 allows the operator to recognize the conditions ahead and to the rear of the assist device 10 in the spent fuel pool 26, thereby allowing the operator to locate the assist device 10. The display device 35 may be a single display device that can show the aforementioned images on a multiple-split screen or may be made up with a plurality of display devices that can show the aforementioned images, respectively.

In FIG. 2, a cable attachment-to-attachment distance 23, which is a distance between the connector 15 of the underwater vehicle 20 and the cable dispenser 18 of the assist device 10, and a yaw angle 24 from the position of the connector 15 toward the cable dispenser 18 can be obtained if a vertical distance 21 and a horizontal distance 22 between the connector 15 and the cable dispenser 18. The calculations of the cable attachment-to-attachment distance 23 and yaw angle 24 will be described later.

Figure 1:
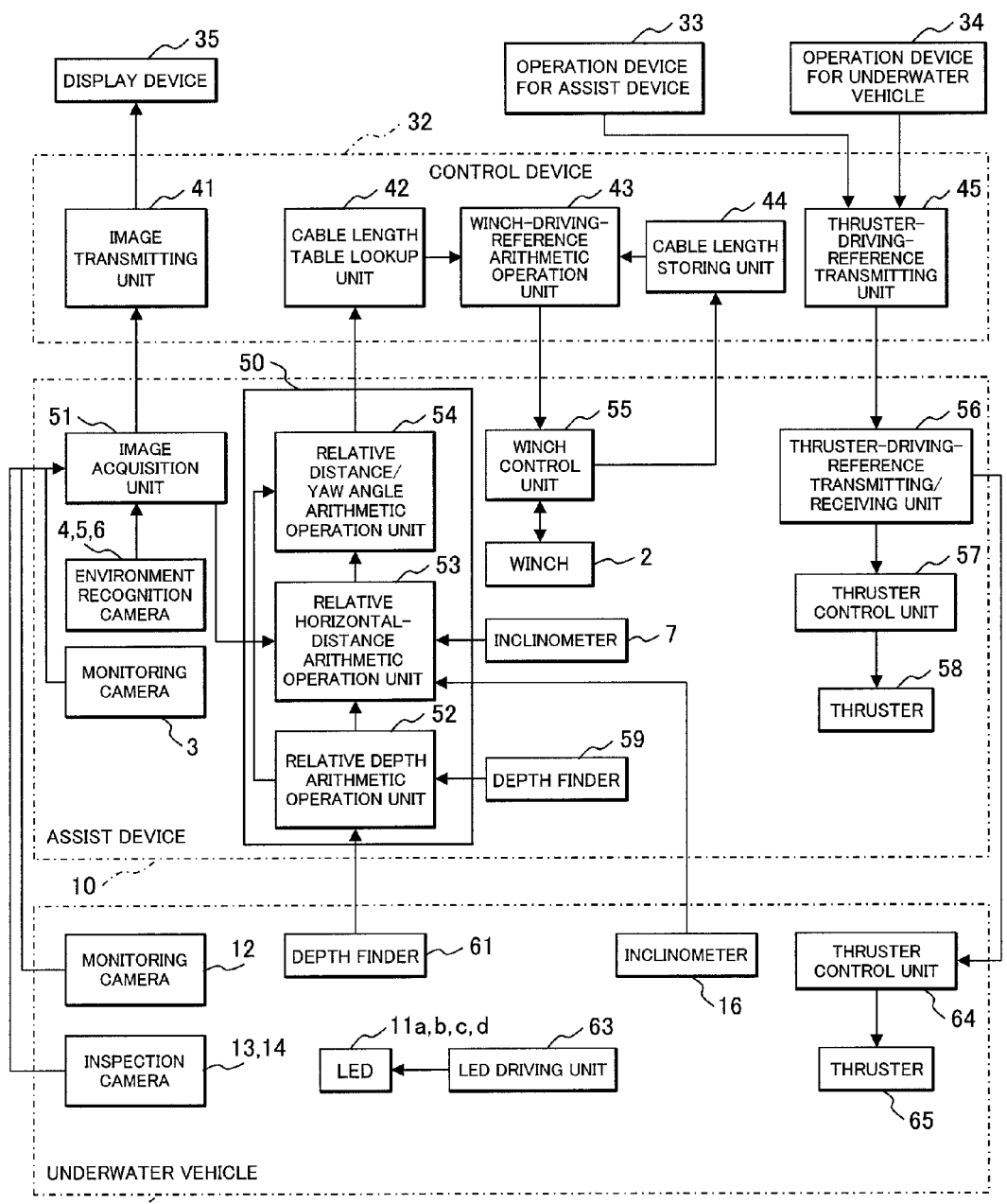
FIG. 1 is a functional block diagram of a system for attitude control of an underwater vehicle according to the first embodiment of the present invention.

Descriptions on the specific configuration of the underwater vehicle 20, assist device 10, and control device 32 will be given. FIG. 1 is a functional block diagram of the system for attitude control of the underwater vehicle according to the first embodiment of the present invention.

The underwater vehicle 20 includes a thruster 65 that is a propulsion mechanism to move the underwater vehicle 20 through the water, a thruster control unit 64 that controls the thruster 65, an LED driving unit 63 that drives LEDs 11a, 11b, 11c, 11d mounted at four positions on the upper surface of the underwater vehicle 20, the aforementioned inclinometer 16, the depth finder 61, the monitoring camera 12, and the inspection cameras 13, 14.

The assist device 10 includes a thruster 58 that is a propulsion mechanism to move the assist device 10 on the water and near the water surface, a thruster control unit 57 that controls the thruster 58, and a thruster-driving-reference transmitting/receiving unit 56. The thruster-driving-reference transmitting/receiving unit 56 receives a reference for thruster driving transmitted from a thruster-driving-reference transmitting unit 45 of the control device 32 via the cable 8 and transmits the reference for thruster driving to the thruster control unit 57 and the thruster control unit 64 of the underwater vehicle 20 via the cable 1. With this configuration, the underwater vehicle 20 and assist device 10 can be moved to desired positions in the spent fuel pool 26.

In addition, the assist device 10 includes the aforementioned winch 2, a winch control unit 55 that controls the winch 2, and an image acquisition unit 51. The image acquisition unit 51 acquires captured images from the monitoring camera 3 and environment recognition cameras 4, 5, 6 and captured images transmitted from the monitoring camera 12 and inspection cameras 13, 14 of the underwater vehicle 20 via the cable 1, and transmits the captured images to an image transmitting unit 41 of the control device 32 via the cable 8. The assist device 10 also includes a cable attachment-to-attachment distance arithmetic operation unit 50 that acquires data measured by the inclinometers 7, 16 and depth finders 59, 61 to determine a cable attachment-to-attachment distance 23 and yaw angle 24. This cable attachment-to-attachment distance arithmetic operation unit 50 includes, for example, a CPU and memories, such as RAM and ROM, and is implemented by running data and programs stored in the memories.

The cable attachment-to-attachment distance arithmetic operation unit 50 includes a relative depth arithmetic operation unit 52, a relative horizontal-distance arithmetic operation unit 53, and a relative distance/yaw angle arithmetic operation unit 54. The relative depth arithmetic operation unit 52 acquires depth data of the assist device 10 measured by the depth finder 59 and depth data of the underwater vehicle 20 measured by the depth finder 61 and transmitted via the cable 1, and determines the vertical distance 21 between the cable attachments by calculating the difference between the depth data values. The depth finder 59 used herein is to measure the depth at which the assist device 10 is present, and the vertical positional relation between the depth finder 59 and cable dispenser 18 has been apparent since the depth finder 59 was installed. Using the vertical distance as an offset value can convert the depth data acquired from the depth finder 59 into depth data at which the cable dispenser 18 is present. In the same manner, the depth data acquired from the depth finder 61 can be converted into depth data at which the connector 15 of the underwater vehicle 20 is present. It should be noted that the depth data described below are data with offset values taken into consideration unless otherwise noted. The relative horizontal-distance arithmetic operation unit 53 acquires image data that contains an image of LEDs 11a, 11b, 11c, 11d mounted on the upper surface of the underwater vehicle 20 and is captured by the monitoring camera 3 from the image acquisition unit 51 and determines the horizontal distance 22 between the cable attachments based on the calculated vertical distance 21. It is preferable to perform rotation correction on the image data acquired from the image acquisition unit 51 based on the tilt (attitude) of the assist device 10 measured by the inclinometer 7 and the tilt (attitude) of the underwater vehicle 20 measured by the inclinometer 16 to determine the horizontal distance 22.

Figure 3:
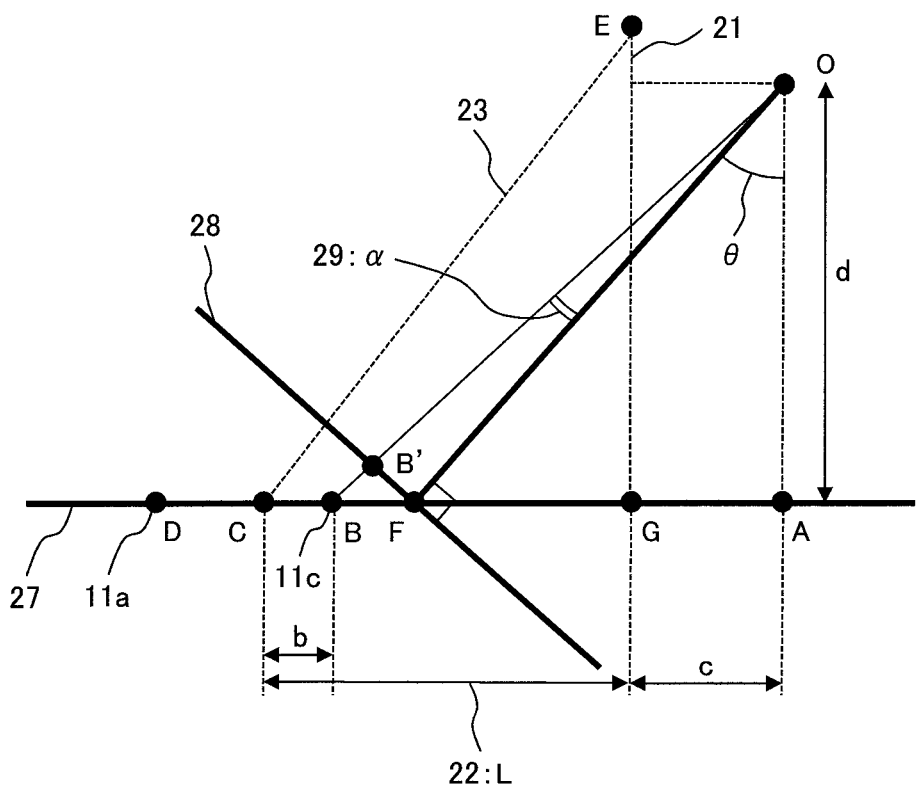
FIG. 3 illustrates how to calculate horizontal travel distance in the first embodiment of the present invention.

FIG. 3 illustrates how to calculate the horizontal travel distance in this embodiment of the invention. The calculation method is an example to calculate the horizontal distance 22 from the image data corrected by rotation. Origin point 0 denotes the center of a lens of the monitoring camera 3, a plane 27 is a plane passing through the center enclosed by the LEDs 11a, 11b, 11c, 11d mounted at four positions on the underwater vehicle 20, and a plane 28 is an imaging plane captured by the monitoring camera 3 at a swing angle θ. The horizontal distance 22 is the length of a line segment CG and can be expressed by Expression 1.

[Expression 1]

$$\overline{CG} = \overline{BC} + \overline{BG} \quad (1)$$

In Expression 1, C denotes the center of the connector 15, and G denotes the intersection point of the plane 27 and a perpendicular line drawn down from the cable dispenser 18. Value α of ∠B'OF is obtained from length B'F of the imaging plane, and line segment BG is expressed by Expression 2. In Expression 2, B denotes the center of the LED 11c, B' denotes the point where B is projected onto the imaging plane, and F denotes the intersection point of the optical axis of the monitoring camera 3 and the imaging plane 28. With reference to Expressions 1 and 2, the horizontal distance 22 is obtained by Expression 3. The horizontal distance 22 can be obtained under the same concept even if another LED, 11a, 11b, or 11d, is used in these expressions.

[Expression 2]

$$\overline{BG} = \overline{AB} - \overline{AG} = d\tan(\alpha+\theta) - c \quad (2)$$

[Expression 3]

$$\overline{CG} = L = b + d\tan(\alpha+\theta) - c \quad (3)$$

The relative distance/yaw angle arithmetic operation unit 54 determines a cable attachment-to-attachment distance 23 and yaw angle 24 based on the obtained vertical distance 21 and horizontal distance 22, and transmits the values to the control device 32 via the cable 8.

The control device 32 includes an image transmitting unit 41, a cable length table lookup unit 42, a winch-driving-reference arithmetic operation unit 43, a cable length storing unit 44, and a thruster-driving-reference transmitting unit 45. The thruster-driving-reference transmitting unit 45 converts an amount of operation (amount of travel), which is output from the operation device 33 and used to instruct the assist device 10 to move, and an amount of operation (amount of travel), which is output from the operation device 34 and used to instruct the underwater vehicle 20 to move, into reference values for the thrusters 58, 65 and transmits the values to the thruster-driving-reference transmitting/receiving unit 56. The cable length table lookup unit 42 obtains a cable length associated with the cable attachment-to-attachment distance 23 and yaw angle 24 input from the cable attachment-to-attachment distance arithmetic operation unit 50 by searching a cable length table that is internally stored in advance. The cable length storing unit 44 updates the length of the cable 1 to the current length based on the amount of the cable 1 wound up or let out by the winch 2 transmitted from the winch control unit 55 every time the winch 2 is operated. Thus, the cable length storing unit 44 stores the latest cable length. The winch-driving-reference arithmetic operation unit 43 acquires a cable length L from the cable length table lookup unit 42 and the current cable length from the cable length storing unit 44, determines the amount of the cable 1 to be wound up or let out based on the difference between the cable lengths, and outputs the amount as a winch reference value.

Figures 4, 5:
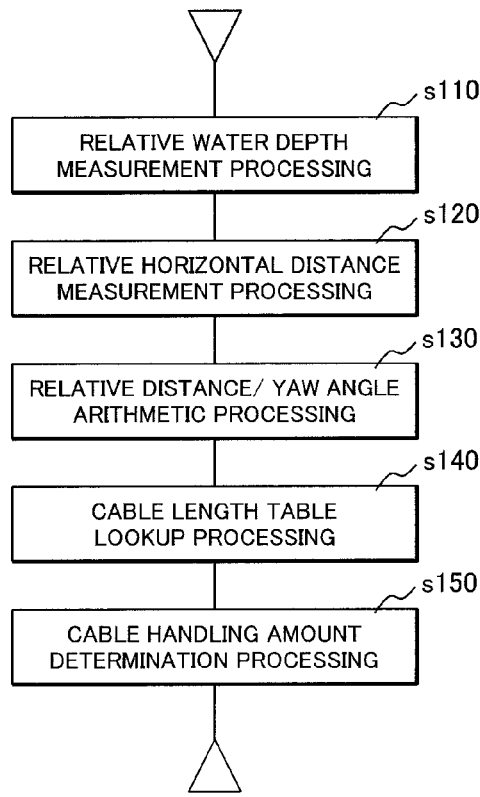
FIG. 4 shows a cable length table used by the system for attitude control of the underwater vehicle according to the first embodiment of the present invention.
FIG. 5 is a flowchart of cable assist processing performed by the system for attitude control of the underwater vehicle according to the first embodiment of the present invention.

Next, the cable length table previously stored in the cable length table lookup unit 42 will be described. FIG. 4 shows a cable length table used by the system for attitude control of the underwater vehicle according to the embodiment of the present invention. In FIG. 4, the cable length table provides a listing of cable attachment-to-attachment distance 23, yaw angle 24, acceptable range equivalent to the amount of slack of the cable, and cable length, that are associated with each other. For instance, where the cable attachment-to-attachment distance 23 is D2 (15, 18) and the yaw angle 24 is θ2, the acceptable range is ΔL and the cable length is L2. The cable length L2 is equivalent to a value obtained by adding the acceptable range ΔL to D2 (15, 18) or cable attachment-to-attachment distance 23. Taking the acceptable range ΔL, which is an amount of slack of cable 1, into account can reduce the effects of external force from cable 1 on the underwater vehicle 20 traveling through the water. For example, it is assumed that the underwater vehicle 20 moves along the wall surface of the spent fuel pool 26 to inspect the soundness of the wall surface. If, at this point, excess tension is applied to the connector 15, which fastens one end of the cable 1, as external force from the cable 1, the underwater vehicle 20 traveling along the wall surface receives impactive force that may lead to problems, such as dropping off or leaving the wall surface. However, according to the present embodiment, the cable 1 is wound up or let out in consideration of the acceptable range ΔL as described above, thereby avoiding the occurrence of such problems.

The acceptable range ΔL, which is set as an amount of slack of the cable 1, can be determined based on evaluation data obtained by navigating the assist device 10 and underwater vehicle 20 coupled to each other with the cable 1 through the water. In FIG. 4, the acceptable range is set to ΔL that is common to all the cable attachment distances 23 and yaw angles 24; however, this is not indispensable and different acceptable range values can be set to each of them.

FIG. 5 is a flowchart of cable assist processing performed by the system for attitude control of the underwater vehicle according to the first embodiment of the invention.

Relative water depth measurement processing step s110 will be described. Water depth data measured by the depth finder 59 provided to the assist device 10 and water depth data measured by the depth finder 61 provided to the underwater vehicle 20 are input via the cable 1 to the relative depth arithmetic operation unit 52 that in turn calculates the difference between the water depth data of the assist device 10 and the water depth data of the underwater vehicle 20.

Relative horizontal-distance measurement processing step s120 is performed by the relative horizontal-distance arithmetic operation unit 53. The relative horizontal-distance arithmetic operation unit 53 acquires image data that includes images of an area covering the four LEDs 11a, 11b, 11c, 11d mounted on the upper surface of the underwater vehicle 20 and is captured by the monitoring camera 3 and also acquires tilt angle a measured by the inclinometer 7 provided in the assist device 10 and tilt angle b measured by the inclinometer 16 provided in the underwater vehicle 20. Then, the relative horizontal-distance arithmetic operation unit 53 calculates the difference between the tilt angle a and tilt angle b to determine differential tilt angle c that in turn is used to perform image rotation to correct the image data. Rotation correction is performed by executing image processing, such as an affine transformation. The relative horizontal-distance arithmetic operation unit 53 extracts positions of the four LEDs 11a, 11b, 11c, 11d from the image data subjected to rotation correction to obtain the positions and sizes of the four LEDs, and calculates the horizontal distance 22 between the cable attachments based on the difference of the water depth data obtained in step s110.

Relative distance/yaw angle arithmetic operation processing step s130 is performed by the relative distance/yaw angle arithmetic operation unit 54. The relative distance/yaw angle arithmetic operation unit 54 determines the cable attachment-to-attachment distance 23 and yaw angle 24 based on the horizontal distance 22 between the cable attachments calculated in step s120 and the vertical distance 21 between the cable attachments calculated as the difference between the water depth data.

Cable length table lookup processing step s140 will be described. The cable length table lookup unit 42 refers to the cable length table shown in FIG. 4 to extract a cable length L associated with the cable attachment-to-attachment distance 23 and yaw angle 24 calculated in step s130.

In cable handling amount determination processing step s150, the winch-driving-reference arithmetic operation unit 43 retrieves the current cable length from the cable length storing unit 44 and calculates the difference between the retrieved current cable length and the cable length L obtained in step s140. The amount of cable to be wound up or let out is determined according to the difference between the cable lengths.

Since the cable length storing unit 44 is updated to store the current cable length every time the winch 2 is operated, the effects of external force from the cable 1 on the underwater vehicle 20 can be reduced, thereby improving maneuverability of the underwater vehicle 20.

Even though the cable attachment-to-attachment distance 23 does not change, the underwater vehicle 20 and assist device 10 may generate a difference in angle between their attitudes in a horizontal plane that may twist the cable 1 and therefore may produce external force. The difference in attitude angle in a horizontal plane between the underwater vehicle 20 and assist device 10 can be prevented by controlling the thrusters 58, 65 of the underwater vehicle 20 and assist device 10 independently of the cable length adjustment.

In this embodiment, LEDs are provided at four positions on an upper surface of the underwater vehicle 20 as light emitting devices; however, the present invention is not limited thereto and any number of, but at least two, light emitting devices can be used.

Furthermore, it is not always necessary to provide the light emitting devices on the upper surface of the hull, but it depends on the transparency of the water through which the underwater vehicle 20 moves. In the case where the light emitting devices are not provided, for example, the horizontal distance 22 between cable attachments can be determined by providing markers in a characteristic shape on the upper surface of the underwater vehicle 20.

Second Embodiment

Figure 6:
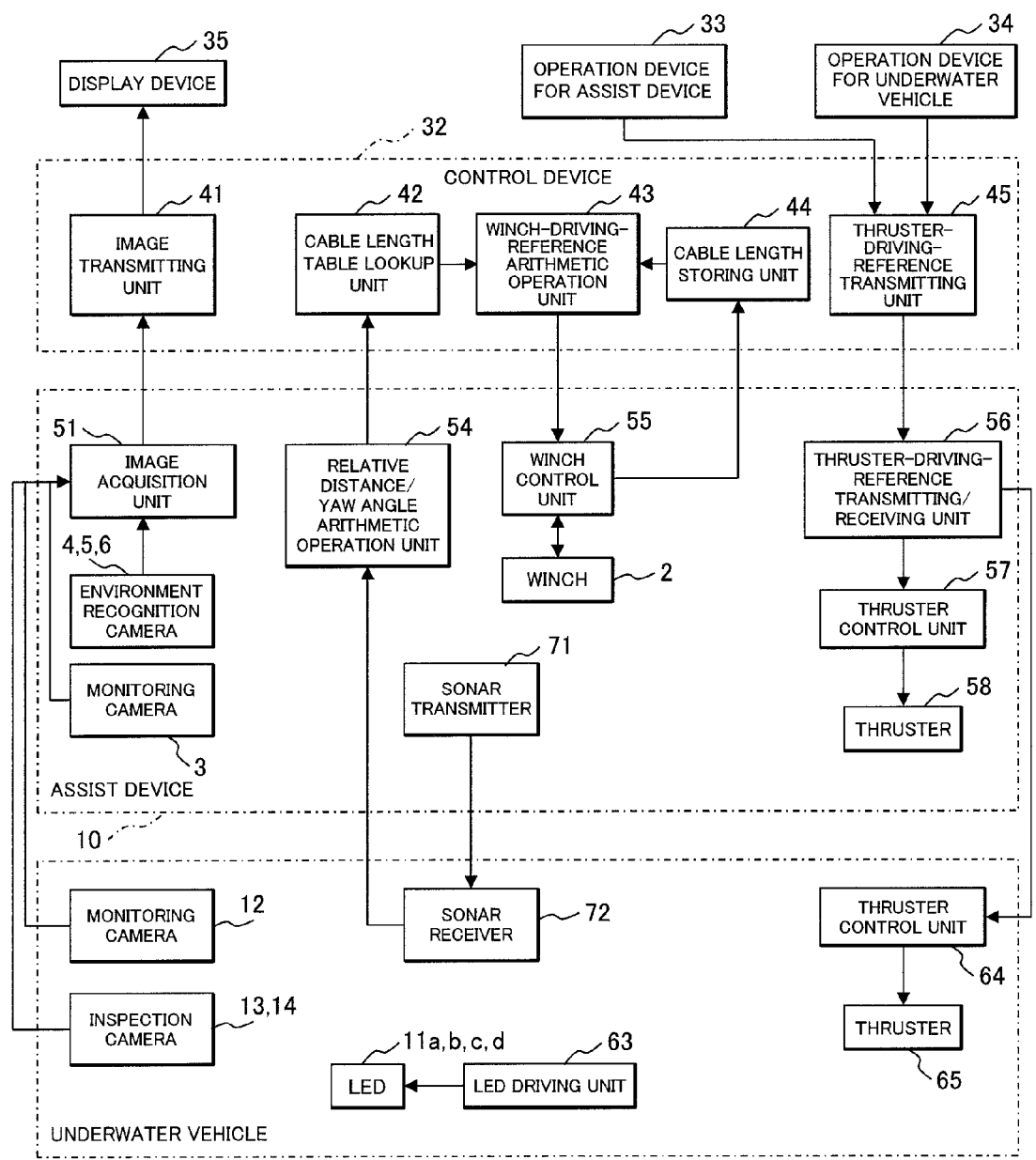
FIG. 6 is a functional block diagram of a system for attitude control of an underwater vehicle according to the second embodiment of the present invention.

FIG. 6 is a functional block diagram of a system for attitude control of an underwater vehicle according to another embodiment of the present invention. In FIG. 6, the same components as those in the first embodiment are designated with the same reference numerals. The difference from the first embodiment is that the assist device 10 includes a sonar transmitter 71 instead of the inclinometer 7 and depth finder 59 and the underwater vehicle 20 includes a sonar receiver 72 instead of the inclinometer 16 and depth finder 61. In addition, the assist device 10 is configured to include only the relative distance/yaw angle arithmetic operation unit 54, but not the relative depth arithmetic operation unit 52 and relative horizontal-distance arithmetic operation unit 53.

The sonar transmitter 71 contains a plurality of crystal resonators arranged in a two-dimensional matrix and electronically scans these crystal resonators. The sonar receiver 72 receives the scanning results to make it possible to measure the cable attachment-to-attachment distance 23 and yaw angle 24 at once. Scanning can be also achieved by a mechanical scan method involving rotation of a galvanometer mirror, instead of the electronic scan method.

Figure 7:
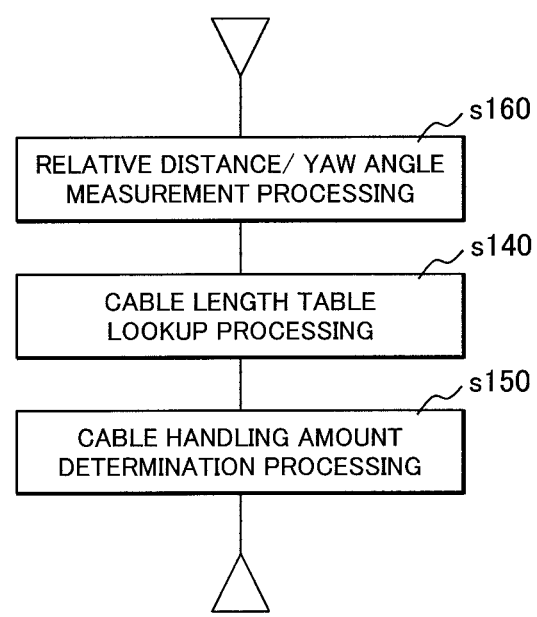
FIG. 7 is a flowchart of cable assist processing performed by the system for attitude control of the underwater vehicle according to the second embodiment of the present invention.

FIG. 7 is a flowchart of cable assist processing performed by the system for attitude control of the underwater vehicle according to the second embodiment of the present invention. The difference from the first embodiment is that the cable assist processing does not include the relative water depth measurement processing step s110 and relative horizontal-distance measurement processing step s120, but executes the cable length table lookup processing step s140 and cable handling amount determination processing step s150 after relative distance/yaw angle measurement processing step s160 is performed. The other processing steps of the second embodiment are the same as those of the first embodiment, and therefore their explanations are omitted.

In the second embodiment, the effects of external force from the cable 1 on the underwater vehicle 20 can be reduced as with the case of the first embodiment, thereby improving the maneuverability of the underwater vehicle 20. The second embodiment enabling measurement of the cable attachment-to-attachment distance 23 and yaw angle 24 at once can make the processing faster than the first embodiment. Even if the underwater vehicle 20 needs to move through turbid water, calculation of the cable attachment-to-attachment distance is possible in this embodiment.

Although the sonar transmitter 71 and sonar receiver 72 are used in the system of the second embodiment, they can be replaced with a laser transmitter and a laser receiver. In this case, raster scanning involving scanning in a line direction (x-direction) and scanning in a tilt direction (y-direction) is performed, and the cable attachment-to-attachment distance 23 and yaw angle 24 can be obtained at once by considering the relationship with the laser receiver.

The cable length table has a column field of acceptable range, which denotes the amount of slack of cable in the first and second embodiments; however, the present invention is not limited thereto, and the cable length table can be configured so as to store cable length data with the acceptable range already taken into account. In addition, yaw angles are not indispensable in the cable length table, and therefore the cable length table can be configured so as to store associations among the cable attachment-to-attachment distance, acceptable range, and cable length.

Furthermore, the first and second embodiments are configured so that the assist device 10 includes the cable attachment-to-attachment distance arithmetic operation unit 50 and relative distance/yaw angle arithmetic operation unit 54; however, the present invention is not limited thereto and can be configured so that the control device 32 includes those units. However, in this case, data necessary for calculations need to be transmitted to the control device 32 via the cable 8, and therefore communication delay is unavoidable more or less unlike the first and second embodiments.

The present invention should not be limited to the above embodiments, but includes various modifications. For example, the above embodiments are detailed descriptions for comprehensively explaining the present invention, and the invention should not necessarily be limited to include all the configurations described above. Furthermore, a part of a configuration in one embodiment can be replaced by a configuration in another embodiment, and a configuration in one embodiment can be added to a configuration in another embodiment. A part of a configuration in each embodiment can also be added to, deleted from, or replaced by another configuration.

REFERENCE SIGNS LIST 1, 8 cable
2 winch
3, 12 monitoring camera
4, 5, 6 environment recognition camera
10 assist device
13, 14 inspection camera
7, 16 inclinometer
15 connector
18 cable dispenser
20 underwater vehicle
32 control device
42 cable length table lookup unit
50 cable attachment-to-attachment distance arithmetic operation unit
52 relative depth arithmetic operation unit
53 relative horizontal-distance arithmetic operation unit
54 relative distance/yaw angle arithmetic operation unit

What is claimed is:

1. A system for attitude control of an underwater vehicle comprising:
an underwater vehicle that includes a thruster;
an assist device that is coupled to said underwater vehicle with a cable and includes cable handling equipment and a thruster;
a cable attachment-to-attachment distance arithmetic operation unit that detects a distance between a cable attachment of said underwater vehicle and a cable dispenser, serving as a cable attachment, of the assist device; and
a control unit that stores the relationship between the cable attachment-to-attachment distance and cable length including a predetermined amount of slack and determines the amount of cable to be wound up or let out based on said cable length associated with said detected cable attachment-to-attachment distance.

2. The system for attitude control of the underwater vehicle according to claim 1,
wherein said assist device includes a depth finder of said assist device and an image acquisition unit that acquires images of an upper surface of said underwater vehicle,
said underwater vehicle includes a depth finder of said underwater vehicle and a plurality of light emitting devices on the upper surface of a hull thereof, and
said cable attachment-to-attachment distance arithmetic operation unit determines said cable attachment-to-attachment distance based on water depth data from said depth finder of said assist device and said depth finder of said underwater vehicle and said captured images, said images including images of said light emitting devices and being input from said image acquisition unit.

3. The system for attitude control of the underwater vehicle according to claim 2,
wherein said assist device and said underwater vehicle include an inclinometer of said assist device and an inclinometer of said underwater vehicle, respectively,
said cable attachment-to-attachment distance arithmetic operation unit further comprising:
a relative depth arithmetic operation unit that determines vertical distance between said cable attachments based on a difference between water depth data from said depth finder of said assist device and water depth data from said depth finder of said underwater vehicle;
a relative horizontal-distance arithmetic operation unit that determines horizontal distance between said cable attachments by obtaining a difference between a tilt angle from said inclinometer of said assist device and a tilt angle from said inclinometer of said underwater vehicle and performing rotation correction on said captured images including said light emitting devices with said differential tilt angle; and
a relative distance/yaw angle arithmetic operation unit that determines said yaw angle from said cable attachment of said underwater vehicle to said cable dispenser of said assist device and said cable attachment-to-attachment distance based on said vertical distance and horizontal distance between the cable attachments.

4. The system for attitude control of the underwater vehicle according to claim 1,
wherein said assist device includes a sonar transmitter having a plurality of crystal resonators arranged in a two-dimensional matrix,
said underwater vehicle includes a sonar receiver that receives ultrasound from said sonar transmitter, and
said cable attachment-to-attachment distance arithmetic operation unit determines said cable attachment-to-attachment distance based on the results of transmission and reception of the ultrasound between said sonar transmitter and said sonar receiver.

5. The system for attitude control of the underwater vehicle according to claim 1,
wherein said assist device includes a laser transmitter and said underwater vehicle includes a laser receiver, and
said cable attachment-to-attachment distance arithmetic operation unit determines said cable attachment-to-attachment distance based on the results of transmission and reception of the laser between said laser transmitter and said laser receiver.

6. The system for attitude control of the underwater vehicle according to claim 1,
wherein said control unit further comprising:
a cable length table lookup unit that includes a cable length table storing said relationship between said cable attachment-to-attachment distance and cable length including a predetermined amount of slack and extracts a cable length associated with said detected cable attachment-to-attachment distance from said cable length table; and a cable length storing unit that stores a current cable length obtained concurrently with operation of said cable handling equipment, wherein said control unit determines said amount of cable to be wound up or let out by comparing said extracted cable length with said current cable length.

7. The system for attitude control of the underwater vehicle according to claim 2, wherein said control unit further comprising:

a cable length table lookup unit that includes a cable length table storing said relationship between said cable attachment-to-attachment distance and cable length including a predetermined amount of slack and extracts a cable length associated with said detected cable attachment-to-attachment distance from said cable length table; and a cable length storing unit that stores a current cable length obtained concurrently with operation of said cable handling equipment, wherein said control unit determines said amount of cable to be wound up or let out by comparing said extracted cable length with said current cable length.

8. The system for attitude control of the underwater vehicle according to claim 3, wherein said control unit further comprising:

a cable length table lookup unit that includes a cable length table storing said relationship between said cable attachment-to-attachment distance and cable length including a predetermined amount of slack and extracts a cable length associated with said detected cable attachment-to-attachment distance from said cable length table; and a cable length storing unit that stores a current cable length obtained concurrently with operation of said cable handling equipment, wherein said control unit determines said amount of cable to be wound up or let out by comparing said extracted cable length with said current cable length.

9. The system for attitude control of the underwater vehicle according to claim 4, wherein said control unit further comprising:

a cable length table lookup unit that includes a cable length table storing said relationship between said cable attachment-to-attachment distance and cable length including a predetermined amount of slack and extracts a cable length associated with said detected cable attachment-to-attachment distance from said cable length table; and a cable length storing unit that stores a current cable length obtained concurrently with operation of said cable handling equipment, wherein said control unit determines said amount of cable to be wound up or let out by comparing said extracted cable length with said current cable length.

10. The system for attitude control of the underwater vehicle according to claim 5, wherein said control unit further comprising:

a cable length table lookup unit that includes a cable length table storing said relationship between said cable attachment-to-attachment distance and cable length including a predetermined amount of slack and extracts a cable length associated with said detected cable attachment-to-attachment distance from said cable length table; and a cable length storing unit that stores a current cable length obtained concurrently with operation of said cable handling equipment, wherein said control unit determines said amount of cable to be wound up or let out by comparing said extracted cable length with said current cable length.

11. A method for attitude control of an underwater vehicle, the method being performed by a system including said underwater vehicle with a thruster and an assist device coupled to said underwater vehicle with a cable and including cable handling equipment and a thruster, the method comprising:

detecting a distance between a cable attachment of said underwater vehicle and a cable dispenser, serving as a cable attachment, of said assist device;

referring to a cable length table storing the relationship between cable attachment-to-attachment distance and cable length including a predetermined amount of slack to extract a cable length associated with said detected cable attachment-to-attachment distance; and controlling operation of said cable handling equipment based on the amount of cable to be wound up or let out associated with said extracted cable length.

* * * * *